US011929508B2

(12) United States Patent
Kim et al.

(10) Patent No.: US 11,929,508 B2
(45) Date of Patent: *Mar. 12, 2024

(54) ELECTRODE FOR SECONDARY BATTERY

(71) Applicant: SK On Co., Ltd., Seoul (KR)

(72) Inventors: Hyo Mi Kim, Daejeon (KR); Kwang Ho Jeong, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,570

(22) Filed: Mar. 2, 2022

(65) Prior Publication Data

US 2022/0271292 A1 Aug. 25, 2022

Related U.S. Application Data

(63) Continuation of application No. 17/375,055, filed on Jul. 14, 2021.

(30) Foreign Application Priority Data

Jul. 15, 2020 (KR) ........................ 10-2020-0087785

(51) Int. Cl.
*H01M 4/62* (2006.01)
*H01M 4/02* (2006.01)
(Continued)

(52) U.S. Cl.
CPC ........... *H01M 4/622* (2013.01); *H01M 4/366* (2013.01); *H01M 10/052* (2013.01); *H01M 2004/021* (2013.01); *H01M 2004/027* (2013.01)

(58) Field of Classification Search
CPC ......... H01M 4/0404; H01M 4/36–366; H01M 4/621–622; H01M 10/052–0525;
(Continued)

(56) References Cited

U.S. PATENT DOCUMENTS

2010/0159327 A1* 6/2010 Lee ................... H01M 4/133
429/224
2015/0104712 A1 4/2015 Kerlau et al.
(Continued)

FOREIGN PATENT DOCUMENTS

CN 106374110 A 2/2017
KR 1020140140976 A 12/2014
(Continued)

OTHER PUBLICATIONS

KR-102111480-B1 Machine Translation.*

*Primary Examiner* — Mayla Gonzalez Ramos
*Assistant Examiner* — Bethany C Garcia
(74) *Attorney, Agent, or Firm* — The Webb Law Firm

(57) ABSTRACT

An electrode for a secondary battery includes a current collector, a first electrode mixture layer disposed on at least one surface of the current collector and including styrene butadiene rubber, and a second electrode mixture layer disposed on the first electrode mixture layer and including a second styrene butadiene rubber. The first styrene butadiene rubber and the second styrene butadiene rubber have a repeating unit of styrene derived structure and a repeating unit of a butadiene derived structure, the first styrene butadiene rubber containing 40 to 90 mol % of a butadiene monomer based on total content of a monomer, and the second styrene butadiene rubber having a lower content of a butadiene monomer than the content of the first styrene butadiene rubber.

13 Claims, 1 Drawing Sheet

(51) Int. Cl.
*H01M 4/36* (2006.01)
*H01M 10/052* (2010.01)

(58) Field of Classification Search
CPC ......... H01M 2004/021–027; H01M 4/13–133; H01M 4/02; H01M 4/62; Y02E 60/10
See application file for complete search history.

(56) References Cited

U.S. PATENT DOCUMENTS

| | | |
|---|---|---|
| 2015/0243965 A1 | 8/2015 | Ishikawa et al. |
| 2018/0219217 A1* | 8/2018 | Park ...................... H01M 4/133 |
| 2019/0027740 A1 | 1/2019 | Lee et al. |
| 2020/0335795 A1* | 10/2020 | Cha ....................... H01M 4/661 |
| 2021/0167391 A1 | 6/2021 | Jo et al. |
| 2022/0037640 A1 | 2/2022 | Tsuzuki et al. |
| 2022/0131151 A1 | 4/2022 | Jo et al. |

FOREIGN PATENT DOCUMENTS

| | | | |
|---|---|---|---|
| KR | 1020150043517 A | 4/2015 | |
| KR | 1020160040830 A | 4/2016 | |
| KR | 1020180040268 A | 4/2018 | |
| KR | 102111480 B1 * | 5/2020 | ........ H01M 10/0525 |
| WO | 2015037367 A1 | 3/2015 | |
| WO | 2020046026 A1 | 3/2020 | |
| WO | 2020110690 A1 | 6/2020 | |

* cited by examiner

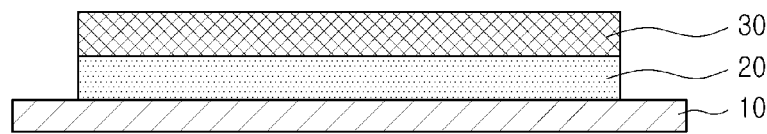

ELECTRODE FOR SECONDARY BATTERY

CROSS-REFERENCE TO RELATED APPLICATION

This application is a continuation of U.S. patent application Ser. No. 17/375,055, filed on Jul. 14, 2021, which claims priority to Korean Patent Application No. 10-2020-0087785 filed Jul. 15, 2020, the disclosures of which are hereby incorporated by reference in their entireties.

BACKGROUND OF THE INVENTION

Field of the Invention

The present disclosure relates to an electrode for a secondary battery, and more particularly, to an electrode for a secondary battery having improved adhesion.

Description of Related Art

As technological development and demand for mobile devices increase, demand for secondary batteries as an energy source is rapidly increasing, and among such secondary batteries, lithium secondary batteries having a high energy density and voltage are commercially available. Such a secondary battery has a structure in which an electrode assembly capable of being charged and discharged while having a positive electrode/separator/negative electrode structure is mounted on a battery case, and in this case, the electrodes of positive and negative electrodes are manufactured by applying an electrode active material or the like to one or both surfaces of a metal current collector, followed by being dried and rolled.

Currently, an electrode plate having high adhesive strength may be manufactured with polyvinylidene fluoride (PVdF) widely used as a binder for positive and negative electrodes. However, PVdF covers the active material in the same state as the polymer fibers are full, and thus, deteriorates the battery performance inherent in the electrode active material in terms of capacity and efficiency. In addition, in the case of PVdF that lacks flexibility, when a material having a large specific surface area and a high expansion and contraction rate during charging and discharging, like natural graphite or a metal-based active material, is used as an electrode active material, the bonding tends to be broken and the cycle characteristics tend to be deteriorated.

In addition, when the amount of active material loading per unit area of the electrode increases, the active material layer is pushed during rolling and the loading amount per unit area is lower than the originally intended value. Accordingly, there is a problem in which manufacturing costs increase as the overall thickness of the electrode is further increased to obtain the required capacity. Accordingly, there is a high need for developing a negative electrode that may improve the performance of a secondary battery and decrease the resistance within the electrode due to an increase in adhesion between the negative electrode current collector and the active material and the cohesion between the active material and the active material.

SUMMARY OF THE INVENTION

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide an electrode for a secondary battery, capable of lowering electrical resistance of a secondary battery while securing adhesion between an electrode current collector and an active material and cohesion between the active material and the active material, and a secondary battery including the same.

According to an aspect of the present disclosure, an electrode for a secondary battery includes a current collector, a first electrode mixture layer disposed on at least one surface of the current collector and including carboxymethyl cellulose and styrene butadiene rubber, and a second electrode mixture layer disposed on the first electrode mixture layer and including carboxymethyl cellulose. A weight average molecular weight of the carboxymethyl cellulose included in the first electrode mixture layer is lower than a weight average molecular weight of the carboxymethyl cellulose included in the second electrode mixture layer.

The weight average molecular weight of the carboxymethyl cellulose included in the first electrode mixture layer may be $40 \times 10^4$ to $300 \times 10^4$.

The weight average molecular weight of the carboxymethyl cellulose included in the second electrode mixture layer may be $350 \times 10^4$ to $600 \times 10^4$.

The styrene butadiene rubber included in the first electrode mixture layer may include 40 to 90 mol % of a butadiene monomer based on a total content of a monomer. The second electrode mixture layer may further include styrene butadiene rubber.

A weight of the styrene butadiene rubber included in the second electrode mixture layer may be equal to or less than a weight of styrene butadiene rubber included in the first electrode mixture layer.

The styrene butadiene rubber included in the second electrode mixture layer may include 5 to 35 mol % of a butadiene monomer based on a total content of a monomer.

The first electrode mixture layer may include 0.6 to 2.0 weight % of carboxymethyl cellulose and 2.0 to 5.0 weight % of styrene butadiene rubber based on a total weight of the first electrode mixture layer.

The second electrode mixture layer may include 0.6 to 2.0 weight % of carboxymethyl cellulose and 2.0 weight % or less of styrene butadiene rubber based on a total weight of the second electrode mixture layer.

A thickness of the first electrode mixture layer may be 10 to 40 μm.

A thickness of the second electrode mixture layer may be 10 to 100 μm.

The electrode may be a negative electrode.

BRIEF DESCRIPTION OF DRAWING

The above and other aspects, features, and advantages of the present inventive concept will be more clearly understood from the following detailed description, taken in conjunction with the accompanying drawings, in which:

FIG. 1 schematically illustrates an electrode according to an exemplary embodiment of the present disclosure.

DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Hereinafter, exemplary embodiments of the present disclosure will be described with reference to various examples. However, embodiments of the present disclosure may be modified into various other forms, and the scope of the present disclosure is not limited to the embodiments described below.

According to an exemplary embodiment, an electrode for a secondary battery is provided, and in detail, an electrode for a secondary battery having improved adhesion is provided.

A binder used in manufacturing the electrode is required to have adhesion properties in which adhesion between the current collector and the active material and cohesion between the active materials may be simultaneously provided, and is a factor that may affect the capacity reduction and stability of the secondary battery if adhesion is not secured. To secure such adhesion properties, it may be considered to increase the content of the binder or employ a method of using a binder having relatively stronger adhesion. However, in this case, inevitably, there is a disadvantage of increasing electrical resistance of the secondary battery.

Accordingly, the present inventors manufactured an electrode having a multilayer structure by using a binder having upper and lower layers having different properties, to secure adhesion between the electrode current collector and the active material as well as cohesion between the active materials and simultaneously reduced resistance within the electrode, thereby realizing the present disclosure.

According to an exemplary embodiment of the present disclosure, an electrode for a secondary battery includes a current collector 10; a first electrode mixture layer 20 disposed on at least one surface of the current collector 10 and including carboxymethyl cellulose and styrene butadiene rubber; and a second electrode mixture layer 30 disposed on the first electrode mixture layer 20 and including carboxymethyl cellulose, and a weight average molecular weight of carboxymethyl cellulose contained in the first electrode mixture layer 20 is lower than a weight average molecular weight of carboxymethyl cellulose contained in the second electrode mixture layer 30.

In an exemplary embodiment of the present disclosure, carboxymethyl cellulose is used as a first binder and styrene butadiene rubber is used as a second binder to secure both adhesion between the electrode current collector and the active material and the cohesion between the active material layers.

The first binder, carboxymethyl cellulose, has a difference in the properties thereof depending on the difference in the weight average molecular weight. According to an exemplary embodiment of the present disclosure, the weight average molecular weight of carboxymethyl cellulose included in the first electrode mixture layer may preferably be lower than the weight average molecular weight of carboxymethyl cellulose contained in the second electrode mixture layer.

In detail, the carboxymethyl cellulose of a high molecular weight may improve the adhesion between the electrode current collector and the active material, but has relatively high electrical resistance and relatively low dispersibility, whereas the carboxymethyl cellulose of a low molecular weight may have slightly lower adhesive strength than that of the high molecular weight carboxymethyl cellulose, but has relatively low electrical resistance and excellent dispersibility. Accordingly, by using a weight average molecular weight of the carboxymethyl cellulose contained in the first electrode mixture layer 20, lower than the weight average molecular weight of the carboxymethyl cellulose contained in the second electrode mixture layer 30, the adhesion between the electrode current collector and the active material may be improved and electrical resistance may also be improved.

The weight average molecular weight of carboxymethyl cellulose included in the first electrode mixture layer 20 may be $40 \times 10^4$ to $300 \times 10^4$, in detail, $60 \times 10^4$ to $200 \times 10^4$. If the weight average molecular weight of carboxymethyl cellulose included in the first electrode mixture layer 20 is lower than $40 \times 10^4$, the viscosity of the slurry may be relatively low and the coating process may be difficult, and if exceeding $300 \times 10^4$, electrical resistance may be relatively high and undissolved substances may be included, and thus, it may be difficult to obtain the effect of the present disclosure for improving the cohesion between active materials and reducing the resistance within the electrode.

The weight average molecular weight of carboxymethyl cellulose included in the second electrode mixture layer 30 may be $350 \times 10^4$ to $600 \times 10^4$, in detail, $350 \times 10^4$ to $450 \times 10^4$. If the weight average molecular weight of carboxymethyl cellulose included in the second electrode mixture layer 30 is less than $350 \times 10^4$, the cohesion between the active material layers is low, and partial detachment of the active material layer may occur in a notching process, and the lifespan characteristics of the battery may also be deteriorated. If exceeding $600 \times 10^4$, electrical resistance may be significantly increased due to an undissolved product of carboxymethyl cellulose, and thus battery characteristics may be deteriorated.

On the other hand, the first electrode mixture layer 20 may contain styrene butadiene rubber as a second binder, and the second electrode mixture layer 30 may also contain styrene butadiene rubber as a second binder if necessary. In this case, it may be preferable that the properties of the styrene butadiene rubber included in the first and second electrode mixture layers may also be different from each other. According to an embodiment, the amount of styrene butadiene rubber included in the second electrode mixture layer may be equal to or less than the amount of styrene butadiene rubber included in the first electrode mixture layer.

The styrene butadiene rubber used as the second binder in the present disclosure refers to a polymer including a repeating unit of a styrene-derived structure and a repeating unit of a butadiene-derived structure. In the styrene butadiene rubber, the repeating unit of the butadiene-derived structure may be a repeating unit of, for example, a structure derived from 1,3-butadiene or a derivative thereof, for example, 1,3-butadiene, isoprene, 2,3-dimethyl-1,3-butadiene, or 2-ethyl-1,3-butadiene, or the like. In addition, the repeating unit of the styrene-derived structure may be a repeating unit of a structure derived from styrene which is an aromatic vinyl compound, such as styrene, α-methylstyrene, p-methyl styrene, 3-methylstyrene, 4-methylstyrene, 4-propylstyrene, 1-vinylnaphthalene, 4-cyclohexylstyrene, 4-(p-methylphenyl) styrene, 1-vinyl-5-hexylnaphthalene, or the like, or a structure of a derivative thereof.

In general, in styrene butadiene rubber, styrene and butadiene maintain mechanical strength and exhibit adhesive properties. The styrene butadiene rubber used in the secondary battery according to an embodiment of the present disclosure may be obtained preferably by synthesizing by adding a monomer capable of imparting friendly properties with an electrolyte in addition to styrene and butadiene to improve battery characteristics, and the monomer is not particularly limited, and for example, an acrylate-based monomer, an acrylonitrile-based monomer, and the like may be used.

On the other hand, in an embodiment of the present disclosure, the styrene butadiene rubber of the first electrode mixture layer 20 may contain 40 to 90 mol % of butadiene monomer based on the total content of the monomer, and in more detail, may contain 50 to 85 mol % of butadiene monomer. If the content of butadiene monomer is less than 40 mol %, interlayer adhesion between the current collector and the active material may be relatively low, and thus, peeling of an outermost punched surface may occur at the time of immersion thereof in the electrolyte. If the content thereof exceeds 90 mol %, electrical resistance is high and the affinity with the electrolyte is low, resulting in the occurrence of a problem in which battery resistance increases.

On the other hand, the styrene butadiene rubber of the second electrode mixture layer 30 may contain 5 to 35 mol % of butadiene monomer, in detail, 5 to 30 mol %, based on the total content of the monomer. If the content of butadiene monomer is less than 5 mol %, the mechanical strength of the styrene butadiene rubber is lowered, and thus, adhesion may decrease, and the lifespan characteristics of the battery may be deteriorated. If the content thereof exceeds 35 mol %, since the affinity with the electrolyte is low, it may be difficult to obtain the effect of the present disclosure for reducing the resistance within the electrode.

In this manner, by using styrene butadiene rubber having a relatively high content of styrene butadiene monomer as a second binder in the first electrode mixture layer 20 that is in contact with the electrode current collector 10, the adhesion to the electrode current collector may be improved. By using styrene butadiene rubber having a low content of styrene butadiene monomer for the second electrode mixture layer 30, electrical resistance may be significantly reduced overall.

On the other hand, in the first electrode mixture layer 20, based on the total weight of the first electrode mixture layer 20, carboxymethyl cellulose may be included in an amount of 0.6 to 2.0% by weight, in detail, 0.8 to 1.8% by weight. If the content of carboxymethyl cellulose included in the first electrode mixture layer 20 is less than 0.6% by weight, it may be difficult to disperse the active material, and accordingly, the viscosity is low, and the processability of the coating process may be deteriorated, whereas the content exceeds 2.0% by weight, the viscosity is too high, and the flowability is low, and accordingly, the processability may be deteriorated, and battery characteristics may also be deteriorated.

In addition, in the first electrode mixture layer 20, based on the total weight of the first electrode mixture layer 20, the styrene butadiene rubber may be included in an amount of 2.0 to 5.0% by weight, in detail, in an amount of 2.0 to 3.5% by weight. If the content of the styrene butadiene rubber contained in the first electrode mixture layer 20 is less than 2.0% by weight, detachment may occur in the notching process due to low adhesion, and if the content exceeds 5.0% by weight, electrical resistance may increase and battery characteristics may be deteriorated.

In the second electrode mixture layer 30, based on the total weight of the second electrode mixture layer 30, carboxymethyl cellulose may be included in an amount of 0.6 to 2.0% by weight, in detail, 0.8 to 1.8% by weight. If the content of carboxymethyl cellulose included in the second electrode mixture layer 30 is less than 0.6% by weight, it may difficult to secure the cohesion between the active material layers, and scrap and partial detachment may occur in the notching process, whereas if the content exceeds 2.0 weight %, it may be difficult to obtain the effect of the present disclosure for improving the cohesion between the active materials and reducing the resistance within the electrode due to high electrical resistance.

In addition, in the second electrode mixture layer 30, based on the total weight of the second electrode mixture layer 30, styrene butadiene rubber may be included in an amount of 2.0% by weight or less, in detail, in an amount of 1.5% by weight or less. If the content of the styrene butadiene rubber contained in the second electrode mixture layer 30 exceeds 2.0% by weight, electrical resistance is increased, and battery characteristics may be deteriorated.

On the other hand, the thickness of the first electrode mixture layer 20 may preferably be 10 to 40 μm. If the thickness is less than 10 μm, scratching of the active material or tearing of the current collector may occur in the coating process, and if the thickness exceeds 40 μm, the effect of the present disclosure may be reduced due to the use of an excessive amount of SBR having a high styrene butadiene content. In addition, the thickness of the second electrode mixture layer 30 may preferably be 10 to 120 μm. If the thickness is less than 10 μm, since the thickness is similar to the primary particle size of the electrode active material, it may be difficult to perform the coating process. On the other hand, if the thickness exceeds 120 μm, the concentration gradient of the styrene butadiene rubber between the first electrode mixture layer and the second electrode mixture layer is relatively great, the effect of the present disclosure may not appear. Accordingly, in an exemplary embodiment of the present disclosure, the thickness ratio of the first electrode mixture layer and the second electrode mixture layer may be 1:1 to 1:3. On the other hand, the mixture density of the first electrode mixture layer and the second electrode mixture layer having the above thickness may be 1.65 g/cc.

A method of manufacturing an electrode for a secondary battery according to an exemplary embodiment of the present disclosure is not particularly limited, and may be performed by a known method. For example, after forming a first electrode mixture layer by applying and drying a first slurry including an electrode active material, a binder and a conductive material in a solvent onto the electrode current collector by a method such as bar coating, casting, spraying or the like; a second slurry including an electrode active material, a binder and a conductive material in a solvent is applied to the first electrode mixture layer and dried, by a method such as bar coating, casting, spraying or the like, thereby manufacturing an electrode for a secondary battery.

As the solvent, for example, dimethyl sulfoxide (DMSO), isopropyl alcohol, N-methylpyrrolidone (NMP), acetone, or water may be used. In the case of the amount of the solvent used, in consideration of the coating thickness of the composition for the formation of an electrode active material layer and a manufacturing yield, the solvent amount may be sufficient as long as it may dissolve and disperse the electrode active material, the conductive material and the binder and it may provide a viscosity capable of exhibiting excellent thickness uniformity at the time of being subsequently applied to form the first electrode active material layer.

On the other hand, the electrode may be a negative electrode, and the secondary battery including the negative electrode according to the present disclosure has reduced resistance in the electrode, and as a result, the capacity and lifespan characteristics of the battery may be significantly improved.

As the negative electrode active material, at least one carbon-based material selected from, for example, crystalline artificial graphite, crystalline natural graphite, amorphous hard carbon, low crystalline soft carbon, carbon black, acetylene black, Ketjen black, super P, grapheme and fibrous carbon, an Si-based material, a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of groups 1, 2 and 3 of the periodic table, halogen; $0<x \leq 1$; $1 \leq y \leq 3$; $1 \leq z \leq 8$) or the like, a lithium metal, a lithium alloy, a silicon alloy, a tin alloy, metal oxides such as $SiO$, $SiO_2$, $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$, a conductive polymer such as polyacetylene or the like, a Li—Co—Ni based material, a titanium oxide, or the like may be used.

The conductive material is used to impart conductivity to the electrode, and is not particularly limited as long as it has conductivity without causing side reactions with other elements of the secondary battery. Detailed examples of the conductive material may include graphite such as natural graphite, artificial graphite or the like; carbon-based materials such as carbon black, acetylene black, ketjen black, channel black, furnace black, lamp black, thermal black, carbon fiber or the like; metal powder particles or metal fibers such as copper, nickel, aluminum, silver or the like; conductive whisker such as zinc oxide and potassium titanate or the like; conductive metal oxides such as titanium oxide; or a conductive polymer such as a polyphenylene derivative or the like, and one thereof alone or a mixture of two or more may be used.

EXAMPLE

Hereinafter, the present disclosure will be described in more detail with reference to examples. The following examples are for explaining the present disclosure in more detail, and the present disclosure is not limited thereby.

1. Preparation of Negative Electrode

A first negative electrode slurry in which artificial graphite is used as a negative electrode active material was coated and dried on a copper foil to form a first negative electrode mixture layer, and a second negative electrode slurry was coated and dried on the first negative electrode mixture layer to prepare a negative electrode. Carboxymethyl cellulose was used as the first binder, and styrene butadiene rubber was used as the second binder. The weight ratios of the first and second binders of the first electrode mixture layer and the second electrode mixture layer were 1.2:1.5 equally. The contents and molecular weights of carboxymethyl cellulose and styrene butadiene rubber contained in the first negative electrode mixture layer and the second negative electrode mixture layer were controlled and are illustrated in Table 1.

The molecular weight of carboxymethyl cellulose illustrated in Table 1 is 0.05 wt %, which is a value analyzed by gel permeation chromatography (GPC) through a dissolution and filtering process.

2. Manufacturing of Lithium Secondary Battery

A positive electrode was manufactured by coating and drying a slurry containing $LiCoO_2$ as a positive electrode active material on an aluminum foil. After interposing a polyolefin separator between the positive electrode and the negative electrode prepared above, an electrolyte solution in which 1 M of $LiPF_6$ was dissolved was injected into a solvent in which ethylene carbonate (EC) and diethyl carbonate (DEC) were mixed in a volume ratio of 30:70, thereby manufacturing a coin-type lithium secondary battery.

3. Adhesion Measurement Experiment (1) Measurement of Adhesion Between Negative Electrode Current Collector and Negative Electrode Mixture Layer After cutting the negative electrode prepared above into a size of 18 mm in width and 150 mm in length, a tape having a width of 18 mm was attached to the negative electrode current collector, and was sufficiently adhered thereto using a roller having a load of 2 kg. Thereafter, the negative electrode mixture layer was adhered to one side of a tensile tester (DS2-50N by IMADA) using a double-sided tape, and then the tape attached to the negative electrode current collector was fastened to the opposite side of the tensile tester to measure the adhesion. The results are illustrated in Table 1.

(2) Measurement of Cohesion Between Negative Electrode Mixture Layers

The surface of the negative electrode mixture layer prepared above was cut by 10 μm or more using sandpaper of 1000 grit or more, and then cut into the size of 18 mm in width and 150 mm in length. Next, a tape having a width of 18 mm was attached to the negative electrode mixture layer, and sufficiently adhered using a roller having a load of 2 kg. Thereafter, the negative electrode mixture layer was adhered to one side of the tensile tester using a double-sided tape, and then the tape attached to the negative electrode current collector was fastened to the opposite side of the tensile tester to measure the adhesion thereof. The results are illustrated in Table 1.

(3) Measurement of Cycle Capacity Retention Rate

After the manufactured coin-type lithium secondary battery had a resting time for 10 hours, charging and discharging were performed once at 0.1 C-rate to perform a formation process. Thereafter, 0.1 C-rate charging and discharging were performed twice more to measure the cycle capacity of the manufactured battery, and whether or not there was a defect was confirmed. The cycle capacity retention rate was measured by repeating 0.3 C-rate charging and discharging. The results are illustrated in Table 1.

TABLE 1

|  | 2nd negative electrode mixture layer (upper layer) CMC/SBR Composition (wt %) | 1st negative electrode mixture layer (lower layer) CMC/SBR Composition (wt %) | 2nd negative electrode mixture layer (Upper layer) CMC molecular weight/Butadiene content of SBR (mol %) | 1st negative electrode mixture layer (lower layer) CMC molecular weight/Butadiene content of SBR (mol %) | Adhesion between negative electrode current collector and active material (N/18 mm) | Cohesion between active material and active material (N/18 mm) | Cycle capacity retention rate (% @100 cycle) |
|---|---|---|---|---|---|---|---|
| Comparative Example 1 | 1.2/0.5 | 1.2/2.5 | 3 million/80 mol % | 3 million/80 mol % | 0.30 ± 0.05 | 1.40 ± 0.10 | 89.8 |
| Comparative Example 2 | 1.2/0.5 | 1.2/2.5 | 3.5 million/80 mol % | 3.5 million/80 mol % | 0.30 ± 0.05 | 1.45 ± 0.10 | 90.2 |
| Comparative Example 3 | 1.2/0.5 | 1.2/2.5 | 3 million/80 mol % | 350,000/80 mol % | 0.10 ± 0.05 | 1.30 ± 0.10 | 85.2 |
| Comparative Example 4 | 1.2/0.5 | 1.2/2.5 | 3 million/80 mol % | 4.2 million/80 mol % | 0.30 ± 0.08 | 1.40 ± 0.10 | 88.9 |
| Example 1 | 1.2/0.5 | 1.2/2.5 | 4.2 million/35 mol % | 3 million/80 mol % | 0.30 ± 0.05 | 1.50 ± 0.10 | 95.0 |
| Example 2 | 1.2/0.5 | 1.2/2.5 | 4.2 million/20 mol % | 3 million/80 mol % | 0.30 ± 0.05 | 1.50 ± 0.10 | 97.1 |
| Example 3 | 1.2/0.5 | 1.2/2.5 | 4.2 million/20 mol % | 3 million/40 mol % | 0.20 ± 0.05 | 1.50 ± 0.10 | 95.3 |
| Example 4 | 1.2/0.5 | 1.2/2.5 | 4.2 million/20 mol % | 1.4 million/80 mol % | 0.35 ± 0.03 | 1.50 ± 0.10 | 99.2 |
| Example 5 | 1.2/0.0 | 1.2/3.0 | 4.2 million/— | 1.4 million/80 mol % | 0.35 ± 0.03 | 1.40 ± 0.10 | 99.7 |

In Example 1, it can be confirmed that by applying CMC having a molecular weight of 4.2 million to the upper layer and CMC having a molecular weight of 3 million to the lower layer, not only the adhesion of the electrode was significantly improved, but also the capacity retention rate was significantly improved compared to that of the comparative example. From this, it can be seen that the molecular weight of CMC has a great influence on the adhesion of the electrode.

As can be seen in Examples 2 and 3 in which the butadiene content of SBR of the upper layer is 20 mol %, it can be confirmed that the cycle capacity retention rate is improved as the mol % of butadiene in the SBR of the second negative electrode mixture layer decreases. In detail, it can be seen that in the case of the butadiene content of the SBR in the lower layer, Example 2 was also superior to Example 3 in which 40 mol % was used, in terms of adhesion characteristics and lifespan characteristics.

Referring to Example 4, it can be seen that CMC having a molecular weight of 1.4 million and SBR having a butadiene content of 80 mol % were used in the lower layer, and thus, the electrode adhesion was improved, and CMC having a molecular weight of 4.2 million and SBR having a butadiene content of 20 mol % were used in the upper layer, and thus, the resistance characteristics were improved and the lifespan characteristics were also improved.

Example 5 was provided by controlling the CMC/SBR contents of the upper and lower layers, and it could be confirmed that as compared with Example 4, as the content of SBR of the lower layer was increased, the adhesion was further improved, and as SBR, which may act as resistance, was not added to the upper layer, the lifespan characteristics were improved.

In Comparative Example 1 in which the molecular weight of CMC contained in the second electrode mixture layer (upper layer) is less than 3.5 million which is the range limited by the present disclosure, and in Comparative Example 2 in which the molecular weight of CMC contained in the first electrode mixture layer (lower layer) is 3.5 million exceeding 3 million which is the range limited by the present disclosure, it can be confirmed that the comparative examples are not desirable in terms of cycle capacity retention due to the increase in resistance.

As in Comparative Example 3, in the case in which 350,000 ultra-low molecular weight of CMC is applied to the lower layer, it can be seen that not only the adhesion of the electrode is greatly reduced, but also the capacity retention rate of the battery is greatly reduced. CMC having a molecular weight of less than 400,000 is mainly used for dispersion and is not suitable for negative electrode slurry production due to the low thickening effect thereof. Also, it can be seen that the repulsion effect is significantly reduced by covering the active material, resulting in a decrease in the phase stability of the slurry and problems such as SBR aggregation.

As in Comparative Example 4, in the case in which a CMC having a weight average molecular weight exceeding 4 million was used in the lower layer, it can be seen that the capacity retention rate slightly decreased due to an increase in resistance.

As set forth above, according to an exemplary embodiment, adhesion between the electrode current collector and the active material and cohesion between the active materials may be improved, and the resistance within the electrode may be reduced. As a result, the capacity and lifespan characteristics of the battery may be significantly improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

DETAILED DESCRIPTION OF MAIN ELEMENTS

10: current collector
20: first electrode mixture layer
30: second electrode mixture

What is claimed is:

1. An electrode for a secondary battery, comprising:
   a current collector;
   a first electrode mixture layer disposed on at least one surface of the current collector and including a first styrene-butadiene rubber; and
   a second electrode mixture layer disposed on the first electrode mixture layer and including a second styrene-butadiene rubber,
   wherein the first styrene-butadiene rubber and the second styrene-butadiene rubber include a repeating unit of a styrene-derived structure and a repeating unit of a butadiene-derived structure,
   the first styrene-butadiene rubber contains 40 to 90 mol % of a butadiene monomer based on a total content of a monomer, and
   the second styrene-butadiene rubber has a lower content of a butadiene monomer than the content of the first styrene-butadiene rubber.

2. The electrode for a secondary battery of claim 1, wherein the second styrene-butadiene rubber contains 5 to 35 mol % of the butadiene monomer based on the total amount of the monomer.

3. The electrode for a secondary battery of claim 1, wherein the content of the second styrene-butadiene rubber included in the second electrode mixture layer is the same as or lower than a content of the first styrene-butadiene rubber included in the first electrode mixture layer.

4. The electrode for a secondary battery of claim 1, wherein the first electrode mixture layer comprises 2.0 to 5.0% by weight of the first styrene-butadiene rubber, based on a total weight of the first electrode mixture layer.

5. The electrode for a secondary battery of claim 1, wherein the second electrode mixture layer contains 2.0% by weight or less of the second styrene-butadiene rubber, based on a total weight of the second electrode mixture layer.

6. The electrode for a secondary battery of claim 1, wherein the first electrode mixture layer comprises 2.0 to 3.5% by weight of the first styrene-butadiene rubber, based on a total weight of the first electrode mixture layer, and the second electrode mixture layer comprises 1.5% by weight or less of the second styrene-butadiene rubber, based on a total weight of the second electrode mixture layer.

7. The electrode for a secondary battery of claim 1, wherein at least one of the first and second styrene-butadiene rubbers includes at least one of a monomer having a structure derived from acrylate and a monomer having a structure derived from acrylonitrile.

8. The electrode for a secondary battery of claim 1, wherein the thickness of the first electrode mixture layer is in the range of 10 to 40 µm.

9. The electrode for a secondary battery of claim 1, wherein the thickness of the second electrode mixture layer is in the range of 10 to 100µm, and
   the first electrode mixture layer and the second electrode mixture layer have a thickness ratio of 1:1 to 1:3.

10. The electrode for a secondary battery of claim 1, wherein the electrode has an adhesive force of 0.15 to 0.38N/18 mm, between the current collector and a first electrode active material layer.

11. The electrode for a secondary battery of claim 1, wherein the electrode is a negative electrode.

12. A secondary battery comprising the electrode of claim 1.

13. The secondary battery of claim 12, wherein the electrode is a negative electrode.

* * * * *